United States Patent [19]

Danno et al.

[11] Patent Number: 4,494,503

[45] Date of Patent: Jan. 22, 1985

[54] VARIABLE DISPLACEMENT ENGINE

[75] Inventors: Yoshiaki Danno; Nobuaki Murakami, both of Kyoto, Japan

[73] Assignee: Mitsubishi Jidosha Kogyo Kabushiki Kaisha, Tokyo, Japan

[21] Appl. No.: 456,807

[22] Filed: Jan. 10, 1983

[30] Foreign Application Priority Data

Jan. 22, 1982 [JP] Japan .................................. 57-9079

[51] Int. Cl.³ .............................................. F02D 13/06
[52] U.S. Cl. .............................. 123/198 F; 123/90.15; 123/580
[58] Field of Search ..................... 123/198 F, 481, 580, 123/90.15, 90.16

[56] References Cited

U.S. PATENT DOCUMENTS

| | | | |
|---|---|---|---|
| 2,623,617 | 12/1952 | Snyder et al. | 123/198 F |
| 4,144,863 | 3/1979 | Abdoo | 123/198 F |
| 4,184,470 | 6/1980 | Iizuka | 123/198 F |
| 4,201,180 | 5/1980 | Iizuka | 123/198 F |
| 4,227,505 | 10/1980 | Larson et al. | 123/198 F |
| 4,274,382 | 6/1981 | Sugasawa et al. | 123/198 F |
| 4,296,719 | 10/1981 | Takahashi et al. | 123/198 F |
| 4,313,406 | 2/1982 | Iizuka et al. | 123/198 F |
| 4,331,113 | 5/1982 | Tadokoro et al. | 123/198 F |

Primary Examiner—Ira S. Lazarus
Attorney, Agent, or Firm—Robert E. Burns; Emmanuel J. Lobato; Bruce L. Adams

[57] ABSTRACT

A multiple cylinder engine of the type which is capable of controlling the number of operating cylinders to operate the engine in either in full or partial displacement mode, wherein the operation is switched smoothly between the full displacement and partial displacement in a simplified manner by detection of the pressure in the intake passage of the engine, putting the engine into full displacement mode by a control pressure when the engine is in cold state preferentially to the pressure in the intake passage, thereby shortening the time period of warming up to achieve smooth operation of the engine quickly.

10 Claims, 1 Drawing Figure

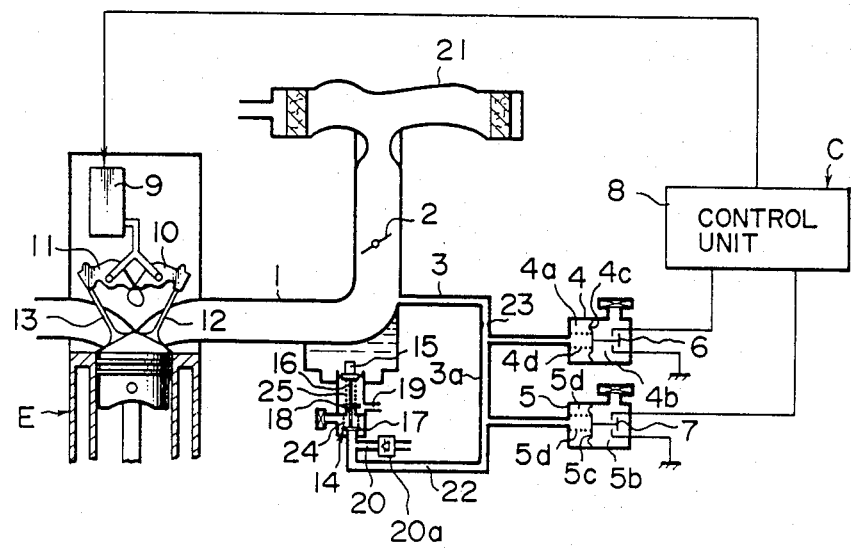

4,494,503

VARIABLE DISPLACEMENT ENGINE

BACKGROUND OF THE INVENTION

1. Field of the Invention

This invention relates to a variable displacement engine which is capable of controlling the number of operating cylinders, holding part of its cylinders at rest according to the operation condition.

2. Description of the Prior Art

The conventional variable displacement engines of this sort are usually operated with part of the cylinders at rest, for example, in a low load condition to enhance the combustion efficiency thereby to prevent emissions of toxic exhaust gases or to raise the load factor for improving the fuel cost by reduction of pumping losses.

However, such conventional variable displacement engines have a problem that it takes an unduly long time for warming up if the engine is put in the partial displacement operation when in cold state.

SUMMARY OF THE INVENTION

It is therefore an object of the present invention to solve the above-mentioned problem, more specifically, to provide a variable displacement engine which is preferentially put in full displacement mode when in cold state for accelerating the warming up of the engine.

According to the present invention, there is provided a variable displacement engine, comprising: a pressure detecting means for detecting the pressure in an intake passage carrying air to be fed to the combustion chambers of the respective cylinders of said engine; a cylinder control means for switching the engine operation to either a full displacement mode with all engine cylinders in operation or a partial displacement mode with part of the engine cylinders in operation, in response to signal from the pressure detecting means; control pressure feed means connected to the pressure detecting means for supplying thereto a control pressure preferentially to the pressure in the intake passage thereby to let the pressure detecting means send to the cylinder control means a signal commanding operation in the full displacement mode; and control pressure switch means for detecting the temperature of the engine and turning on and off the control pressure feed means in response to the detected temperature level of the engine, actuating the control pressure feed means to supply the control pressure to the pressure detecting means to put the engine preferentially in the full displacement mode through the cylinder control means when the control pressure switch means detects that the engine temperature is lower than a predetermined value.

Thus, with the variable displacement engine according to the present invention, the mode of operation is controlled simply by detection of the pressure in the intake passage, effecting smooth switching of operation without variations in output when the engine is operating in normal warmed-up state, when in cold state, the engine is put in the mode of full displacement by a control pressure preferentially to the pressure in the intake passage. Consequently, the warming-up time is shortened to attain smooth engine operations in an accelerated manner. The thermo-valve may be the one which is used for the control of EGR or the like if desired to simplify the construction and reduce the cost of the engine.

The above and other objects, features and advantages of the invention will become apparent from the following description and the appended claims, taken in conjunction with the accompanying drawing which shows by way of example a preferred embodiment of the invention.

BRIEF DESCRIPTION OF THE DRAWING

In the accompanying drawing:

The sole FIGURE is a schematic view of a variable displacement engine according to the present invention.

DESCRIPTION OF THE PREFERRED EMBODIMENT

Referring to the accompanying drawing, there is illustrated a preferred embodiment of the variable displacement engine E according to the invention, in which the engine E is provided with four cylinders in series, namely, a couple of variable cylinders (the first and fourth cylinders in the particular embodiment shown) which are controllable to stop operation under predetermined conditions, and a couple of invariable cylinders (the second and third cylinders) which are constantly put in operation irrespective of the operating condition.

With this sort of variable displacement engine, when the opening of the throttle valve 2 is varied at an arbitrary engine speed in 4-cylinder operation (full displacement operation), there is a point (hereinafter referred to as "cross point" for brevity) where its output equalizes with the output of 2-cylinder operation (partial displacement operation) at the same throttle opening. Paying a special attention to the existence of such cross point, the present inventor contemplated modeling the engine condition at the cross point analized theoretically, and conducted experiments. As a result, it has been found that in 2-cylinder operation the intake manifold vacuum $P_1$ at the cross point remains almost at a constant level (e.g., 120 mmHg gauge) over a wide range of the rotational speed of the engine, and in 4-cylinder operation the intake manifold vacuum $P_2$ at the cross point takes a substantially constant valve (e.g., 450 mmHg guage), which is greater than the cross point intake manifold vacuum in 2-cylinder operation, similarly over a wide range of the rotational speed of the engine.

Consequently, it is possible to switch the engine from 4-cylinder operation to 2-cylinder operation or vise versa smoothly without causing variations in output, by detecting the level of the intake manifold vacuum, and to simplify its control means since it suffices to detect the intake manifold vacuum for the control.

Therefore, according to the present invention, the intake passage 1 which conducts feed air to the respective combustion chambers of the engine E is drawn through an intake manifold vacuum induction passage 3 to a couple of pressure switches, namely, a first vacuum switch 4 and a second vacuum switch 5 which operate in response to the intake manifold vacuum in the intake passage 1. Thus, a pressure detecting means is constituted by the first and second vacuum switches 4 and 5 and the passage 3.

The first vacuum switch 4 is provided with a differential pressure responsive mechanism having chambers 4a and 4b partitioned off from each other by a diaphragm 4c and communicated respectively with the passage 3 and the atmosphere, and a switch member 6 which is opened and closed in relation with movements of the diaphragm 4c. A spring 4d is loaded in the chamber 4a to press the diaphragm 4c, presetting a threshold value of operation, for example, at 120 mmHg gauge.

Accordingly, the first vacuum switch 4 turns off (opens) a switch member 6 when the intake manifold vacuum is smaller than 120 mmHg, turning on (closes) the switch member 6 as soon as the intake manifold vacuum becomes greater than 120 mmHg. As a result, the first vacuum switch 4 opens and closes at the cross point intake manifold vacuum $P_1$ of 2-cylinder operation to produce a control signal for switching the engine to 4-cylinder operation. It is to be noted that the on-off operation of the switch 4 has hysteresis characteristics.

In general, it is preferred to put the engine in 4-cylinder operation in a high load condition with a small intake manifold vacuum, so that a signal obtained from the first vacuum switch 4 which is in open state can be used as a control signal for establishing 4-cylinder operation.

With regard to the second vacuum switch 5, it is also provided with a differential pressure responsive mechanism including chambers 5a and 5b which are partitioned off from each other by a diaphragm 5c and communicated respectively with the passage 3 and the atmosphere, and a switch member 7 which is opened and closed in relation with movement of the diaphragm 5c.

The chamber 5a accommodates therein a spring 5d for pressing the diaphragm 5c, presetting a threshold value of operation at a level which is higher than that of the spring 4d of the first vacuum switch 4, for example, at 450 mmHg gauge.

Accordingly, the second vacuum switch 5 turns off (opens) the switch member 7 when the intake manifold vacuum is smaller than 450 mmHg, turning on (closing) the switch member 7 as soon as the intake manifold vacuum becomes greater than 450 mmHg. Consequently, the second vacuum switch 5 opens and closes at the cross point intake manifold pressure $P_2$ of 4-cylinder operation, so that it can produce a control signal for switching the engine to 2-cylinder operation. It is to be understood that the on-off operation of the switch 5 also has hysteresis characteristics.

Generally, it is desirable to put the engine in 2-cylinder operation under a low load condition with a large intake manifold vacuum, so that the closed signal of the second vacuum switch 5 is used as a control signal for effecting 2-cylinder operation.

In this manner, the first and second vacuum switches 4 and 5 are preset to have different threshold values of operation, and the signals from the switch members 6 and 7 of the respective vacuum switches 4 and 5 are fed to a cylinder operation control means C.

The cylinder operation control means C is constituted by a control unit 8 and a displacement controller (an operating cylinder number controller) 9. When the switch member 6 of the first vacuum switch 4 is in open state, the control unit 8 supplies the displacement controller 9 with a signal for effecting 4-cylinder operation. When the switch member 7 of the second vacuum switch 5 is closed, the displacement controller 9 is supplied with a signal for effecting 2-cylinder operation. This can be attained by a simple logic circuit.

Further, in response to the signals from the control unit 8, the displacement controller 9 change over the paths of operating oil to valve operation stop mechanisms provided respectively with the rocker arm 10 of an intake valve 12 and the rocker arm 11 of an exhaust valve 13 of each variable cylinder, thereby to actuate or stop the operation of the intake and exhaust valves 12 and 13.

According to the invention, there is further provided a control pressure feed means which is constituted by a thermo-valve 14 adapted to open when the cooling water temperature which respresents the engine temperature is lower than 70° C. and to close when the cooling water temperature is higher than 70° C. The thermo-valve 14 includes a temperature sensing portion 15 consisting of a wax element, and a valve member 17 which is connected to the temperature sensing portion 15 through a rod 16.

The valve member 17 of the thermo-valve 14 is inserted in a control conduit 22 which constitutes a control pressure feed means and which has its one end opened to the atmosphere serving as a pressure source and the other end communicated with the chambers 4a and 5a of the first and second vacuum switches 4 and 5 respectively through the intake manifold vacuum induction passage 3.

The intake manifold vacuum induction passage 3 is provided with a constriction 23 between the intake passage 1 and a branch passage to the first vacuum switch 4.

Therefore, when the engine is cold with the engine cooling water temperature lower than 70° C., for example, the thermovalve 14 is opened by the uplifting action of the return spring 24, admitting the atmospheric pressure as a control pressure into the chambers 4a and 5a of the first and second vacuum switches 4 and 5 respectively through the thermo-valve 14 and control conduit 22, preferentially to the intake manifold vacuum from the passage 3, thereby forcibly opening the switch members 6 and 7 of the respective vacuum switches 4 and 5.

Consequently, the first vacuum switch 4 supplies the control unit 8 with a control signal of 4-cylinder operation, putting the engine E in full displacement operation, namely, operating all cylinders of the engine E for warming up same efficiently when in such a cold state.

If the temperature of engine cooling water exceeds 70° C., the wax element which constitutes the temperature sensing portion 15 of the thermo-valve 14 is expanded and the valve member 17 closes the control passage 22 to let the intake manifold vacuum prevail in the chambers 4a and 5a of the respective vacuum switches 4 and 5. Therefore, the engine is put in either 4-cylinder operation or 2-cylinder operation according to the level of the intake manifold vacuum as mentioned hereinbefore.

The above-described thermo-valve 14 can simultaneously serve for controlling on-off of a couple of known differential control valves for EGR (exhaust gas recirculation). More specifically, such EGR control valves are provided in an exhaust gas recirculating passage which communicates the exhaust passage with the intake passage of engine E and recirculate the exhaust gas into the intake passage to control the amount of exhaust gas to be recirculated to the intake passage 1, and each one of these control valves is driven by a pressure responsive device which is provided with a pressure chamber. These control valves are opened when an intake vacuum greater than the predetermined value prevails in the pressure chamber through the pressure conduit which carries the pressure in the intake passage 1. The pressure chamber of one of these pressure responsive devices is communication with a control conduit 19 (atmospheric passage), while the pressure chamber of the other pressure-responsive device is in communication with a control conduit 20 (atmospheric passage). As is well known, the entrance of the pressure conduit is provided at the position slightly upstream of the wall member opposite to the free end on the upstream side of the two free ends of the throttle valve in closed state. Accordingly the pressure equal or smaller than the manifold vacuum prevails in the pressure-responsive device through the pressure concuit. Namely, the thermo-valve 14 establishes or blocks the communication of the control conduits 19 and 20 of the EGR control valves with the atmosphere by operation of the valve members 18 and 17. The control conduit 20 communicates with the control passage 22 through the check valve 20a between the valve member 17 and the vacuum switches 4 and 5.

Therefore, when the temperature of the engine E is lower than a predetermined valve, the valve members 18 and 17 are opened to introduce the atmospheric pressure (control pressure) into the pressure chambers of the pressure-responsive devices for the EGR control valves, thereby holding the EGR control valves in closed state. When the valve member 17 is closed, the check valve 20a prevents the vacuum in the control passage 22 from prevailing in the control conduit 20, thus preventing the error operation of the control valves for the EGR.

The valve member 18 is attached to the rod in a higher position than the valve member 17, and a return spring 25 which has a function similar to the return spring 24 is interposed between the valve member 18 and the temperature sensing portion 15.

In the drawing, the reference numeral 21 denotes an air cleaner. The constriction 23 of the intake manifold vacuum induction passage 3 may be provided at a position 3a between the branch-passage to the first vacuum switch 4 and the joint to the control passage 22.

Instead of the engine cooling water, the engine may be controlled on the basis of the temperature of the engine wall or lubricant oil which also reflects the engine temperature.

Further, although one end of the control passage 22 has been described as being opened into the atmosphere, it may be connected to a pressure source such as a compressed tank or the like.

Needless to say, the present invention can be similarly applied to multi-cylinder engines other than the 4-cylinder engine, or to engines with a supercharger in the intake passage 1 in which positive pressure instantly appears.

What is claimed is:

1. A multicylinder variable displacement engine, comprising:
    a throttle valve provided in an intake passage which supplies feed air to the combustion chamber of each cylinder of a multi-cylinder engine;
    a pressure detecting means for detecting the pressure in said intake passage at a point downstream of said throttle valve;
    cylinder number controlling means for controlling the number of operating cylinders by stopping the operation of part of cylinders by cutting off the supply of the feed air to said part of cylinders;
    control means which, upon receiving the detection signal from said pressure detecting means, gives a signal for a full displacement mode with all cylinders in operation to said cylinder number controlling means when the detected pressure in the intake passage at said point downstream of said throttle valve is above a first preset pressure and on the other hand gives a signal for a partial displacement mode with part of cylinders in operation and the remaining cylinders out of operation to said cylinder number controlling means when the detected pressure in the intake passage at said point downstream of said throttle valve is below a second preset pressure which is lower than said first preset pressure;
    control pressure feed means connected to said pressure detecting means and supplying thereto a control pressure greater than said first preset pressure preferentially to the pressure in the intake passage in order to make said control means give said signal for a full displacement mode;
    control pressure switch means for detecting the temperature of the engine and turning on and off said control pressure feed means in response to detected levels of the engine temperature;
    said first preset pressure being set to an almost constant pressure generated at said point downstream of the throttle valve in the intake passage over a wide range of the rotational speed of the engine before the engine mode is changed from said partial displacement mode to said full displacement mode by means of said cylinder number controlling means in such a manner that the engine output in said partial displacement mode is substantially equal to the engine output in said full displacement mode at a same throttle valve opening, and on the other hand, said second preset pressure being set to another almost constant pressure generated at said point downstream of the throttle valve in the intake passage over a wide range of the rotational speed of the engine after said change of the engine operation mode from the partial displacement one to the full displacement one is completed; and further
    said control pressure feed means being constructed so as to supply said control pressure to said pressure detecting means when said control pressure switch means detects the temperature of the engine is lower than a predetermined value, resulting in that said control means gives said signal for a full displacement mode to said cylinder number controlling means.

2. A variable displacement engine as set forth in claim 1, wherein said control pressure feed means includes a control passage having one end thereof communicated with a source of said control pressure and the other end with said pressure detecting means, and said control pressure switch means includes a thermo-valve having a temperature sensing portion for detecting the engine temperature and a valve member inserted in said control passage and adapted to open and close according to the results of detection by said temperature sensing portion, said thermo-valve being opened when said engine temperature is lower than said predetermined value to supply said control pressure to said pressure detecting means.

3. A variable displacement engine as set forth in claim 2, wherein said control pressure source is the atmosphere.

4. A variable displacement engine as set forth in claim 1, wherein said pressure detecting means includes a first pressure switch for detecting said first preset pressure, a second pressure switch for detecting said second preset pressure, and a pressure induction passage for conducting the pressure in said intake passage to said first and second pressure switches.

5. A variable displacement engine as set forth in claim 4, wherein said control pressure feed means includes a control passage having one end thereof communicated with said control pressure source and the other end with said first and second pressure switches, and said control pressure switch means includes a thermo-valve having a temperature sensing portion for detecting the temperature of said engine and a valve member inserted in said control passage for opening and closing same according to the results of detection by said temperature sensing portion, said thermo-valve opening said control conduit when the temperature of said engine is lower than a predetermined value to apply said control pressure to said first and second pressure switches.

6. A variable displacement engine as set forth in claim 5, wherein said control pressure source is the atmosphere.

7. A variable displacement engine as set forth in claim 6, wherein said engine comprises an exhaust gas recirculating passage communicating an exhaust passage of said engine with said intake passage, an EGR control valve inserted in said exhaust gas recirculating passage to control the amount of exhaust gas to be recirculated to said intake passage, a pressure responsive device for driving said EGR control valve, and a pressure induction passage for introducing the pressure in said intake passage into a pressure chamber of said pressure responsive device to open said EGR control valve, said control passage communicating with said pressure chamber closer to said other end of said control passage than the position of said valve member of said thermo-valve, opening said thermo-valve when the temperature of said engine is lower than a predetermined value to apply the atmospheric pressure to said pressure chamber to maintain said EGR control valve in closed state.

8. A variable displacement engine as set forth in claim 7, comprising an exhaust gas recirculating passage communicating an exhaust passage of said engine with said intake passage, an EGR control valve inserted in said exhaust gas recirculating passage to control the amount of exhaust gas to be recirculated to said intake passage, a pressure responsive device for driving said EGR control valve, a pressure induction passage for introducing the pressure in said intake passage into a pressure chamber of said pressure responsive device for opening said EGR control valve, an atmospheric passage for introducing the atmospheric pressure into said pressure chamber to close said EGR control valve, and an on-off valve inserted in said atmospheric passage and opened and closed according to the results of detection by the temperature sensing portion of said thermo-valve, opening said on-off valve when said engine is in cold state to apply the atmospheric pressure to said pressure chamber.

9. A variable displacement engine as set forth in claim 5, wherein said control passage is constructed to have a flow resistance smaller than that of said pressure induction passage.

10. A variable displacement engine as set forth in claim 9, wherein said pressure induction passage is provided with an orifice.

* * * * *